Patented Oct. 31, 1933

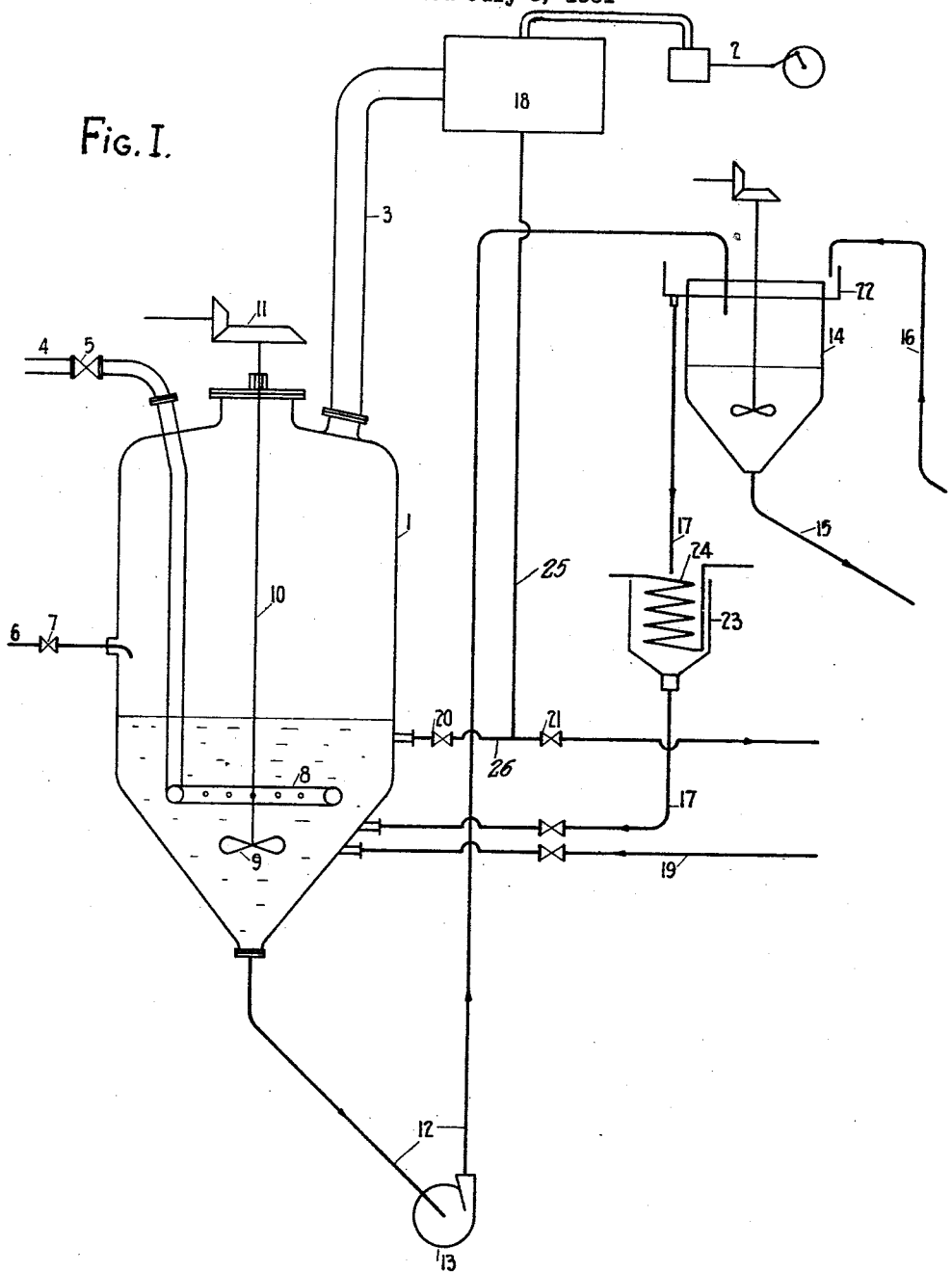

1,932,674

UNITED STATES PATENT OFFICE 1,932,674

PROCESS FOR THE MANUFACTURE OF AMMONIUM SULPHATE

Daniel Pyzel, Piedmont, Calif., assignor to Shell Development Company, San Francisco, Calif., a corporation of Delaware Application July 8, 1931. Serial No. 549,396

12 Claims. (Cl. 23—119)

This invention relates to the production of ammonium sulphate from ammonia and sulphuric acid.

The invention is more specifically concerned with the control of the chemical reaction between the ammonia and sulphuric acid.

The general practice in the commercial manufacture of ammonium sulphate is to bubble ammonia gas through a bath or saturator containing sulphuric acid and ammonium sulphate. The crystals of ammonium sulphate formed by the reaction of the ammonia and the sulphuric acid are removed from the bath to suitable refining apparatus. Existing processes do not allow satisfactory control of the reaction for the purpose of producing crystals of uniform quality.

Another disadvantage of existing saturator operation is that owing to the corrosive nature of the hot acid, replacements of apparatus are often required.

Now I have found that the reaction between ammonia and sulphuric acid can be carried out to great advantage under vacuum conditions. By placing the apparatus containing the acid bath in which the reaction occurs under vacuum the temperature of the bath can be controlled and lowered to that required for the production of proper sized crystals. It has been found that the lower the temperature at which crystallization can thus be made to occur increases the size of crystals produced. Another advantage of great economic value is that a reduction in corrosion and deterioration of the apparatus is effected. A reduction in corrosion rate to as much as one-half to one-third the usual rate may be effected by the use of my process.

I have also found that by returning the smaller crystals to the acid bath crystal growth is greatly promoted.

It is therefore an object of my invention to control the reaction of ammonia with sulphuric acid in such a way that crystals of good size may be more easily and cheaply produced.

It is also an object of my invention to reduce the corrosion of the apparatus.

The further objects and advantages of my invention will be better and more fully understood from the following detailed description, throughout which reference is made to the attached drawing of layout of apparatus suitable for my process.

Fig. I is a view in elevation of the apparatus.

With reference to Fig. I, a saturator, or bath, (1) is maintained under vacuum by a vacuum pump (2) and condenser (18) connected to the saturator by pipe (3). Ammonia is fed into the saturator through pipe (4) at a rate controlled by valve (5) and bubbles through the liquid in the saturator to which sulphuric acid is being added through pipe (6) and valve (7). The ammonia is discharged into the saturator through a perforated distributor ring (8) or similar distributing means connected to the ammonia inlet pipe (4). This distributor ring should be located well below the surface of the acid bath otherwise the ammonia tends to bubble through the bath and escape, resulting in high ammonia losses and correspondingly low yields of ammonium sulphate. A suitable agitator or screw (9) mounted on shaft (10) and operated through gearing (11) should be employed to effect intimate contact of the ammonia and sulphuric acid added to the bath and maintain as nearly a uniform acidity throughout the bath as is possible. This agitator is preferably so located that constantly fresh portions of the bath are drawn over the ammonia and the acid distributing means and then forced to the surface of the bath where through evaporation the heat of neutralization is removed from the bath. By placing the saturator under a vacuum as above described, the boiling temperature of the bath is reduced to conform to this vacuum. By controlling the degree of vacuum existing on the surface of the bath the temperature of the bath can be accurately controlled. Water must be added to the system to balance the steam drawn off through the vacuum line (3). The water evolved as steam passes from the saturator through the vacuum line (3) to a condenser (18). The condensate may be wholly or partly led back into the saturator through lines (25) and (26) by suitable manipulation of valves (20) and (21).

The return of this condensate to the bath may be advantageous as small quantities of ammonia are likely to escape with the steam issuing through pipe (3). The relative fraction of this condensate which can be returned to the bath is dependent directly upon the amount of water introduced into the process with the entering sulphuric acid or ammonia. If the condensate is not returned to the bath or water furnished by the use of weak acid or aqua ammonia, water is added directly to the saturator from line (19).

The ammonium sulphate crystals formed in the saturator are discharged through line (12) by pump (13) into a settler (14).

The larger crystals sink to the bottom of the settler and are removed through a pipe (15) to centrifuging or filtering apparatus. The mother liquor removed from the crystals in this latter apparatus is returned by line (16) to a trough (22) surrounding the top of the settler.

By keeping the level of the material in the settler at a high point and by suitable agitation smaller crystals will be forced to the surface and overflow into the trough (22). These smaller crystals together with mother liquor are then carried back to the saturator through line (17). A tank (23) having a heating coil (24) is interposed in this line for use when aqua ammonia or dilute sulphuric acid is employed. When aqua ammonia below a certain concentration is used, the heat of reaction evolved in the bath will be insufficient to evaporate all the water entering the saturator. Additional heat can then be added to the bath by heating the liquid returning from the crystal settler by means of heating coil (24). Due to the vacuum conditions within the saturator, the temperature of the bath is below the atmospheric boiling point of the solution. The liquor in the tank (23) is not subject to this vacuum condition and can thus be heated to the atmospheric boiling temperature of the solution. In this manner, a large quantity of heat can be introduced into the saturator. This not only enables the use of aqua ammonia but also of waste sulphuric acid of low concentration. In either case the excess water entering the system can be boiled off by means of the heat introduced as sensible heat of the liquor returning from the settler.

It will be understood that the technical advantages of my invention will be progressively realized with the increase of the vacuum and that even a very small degree of vacuum of only a few inches of mercury below atmospheric pressure will be beneficial, though far better results are obtained at high vacua, for instance, at an absolute pressure of four inches of mercury or even lower absolute pressures. However, economic and engineering factors will usually determine how high a vacuum can be used most profitably.

I claim as my invention:

1. A process of forming ammonium sulphate comprising introducing ammonia and sulphuric acid into a container and maintaining said container under vacuum.

2. A process of forming ammonium sulphate comprising introducing ammonia and sulphuric acid into a container, maintaining said container under vacuum, condensing the vapors withdrawn by the vacuum producing means and returning the condensate to the saturator.

3. A process of forming ammonium sulphate comprising introducing ammonia, sulphuric acid and water into a container and maintaining said container under a sub-atmospheric pressure.

4. A process of forming ammonium sulphate comprising introducing ammonia gas and sulphuric acid into a container and maintaining said container under a sub-atmospheric pressure.

5. A process of forming ammonium sulphate comprising introducing liquid anhydrous ammonia and sulphuric acid into a container and maintaining said container under a sub-atmospheric pressure.

6. A process of forming ammonium sulphate comprising introducing aqua ammonia and sulphuric acid into a container and maintaining said container under a sub-atmospheric pressure.

7. A process of forming ammonium sulphate comprising introducing ammonia and sulphuric acid into a saturator, maintaining the pressure in the saturator substantially below a pressure of 760 millimeters of mercury and controlling the temperature of the saturator by varying the amount the pressure in the saturator is below 760 millimeters.

8. A process of forming ammonium sulphate comprising continuously adding ammonia and sulphuric acid to a saturator maintained under vacuum, controlling the temperature of the saturator by means of the vacuum applied, continuously withdrawing the ammonium sulphate formed, separating the mother liquor from the crystals of ammonium sulphate and returning the mother liquor to the saturator.

9. A process of forming ammonium sulphate comprising continuously adding ammonia and sulphuric acid to a saturator maintained under vacuum, controlling the temperature of the saturator by means of the vacuum applied, continuously withdrawing the ammonium sulphate formed, separating the crystals of ammonium sulphate from the mother liquor, returning the mother liquor to the saturator, condensing the vapors withdrawn by the vacuum producing means and returning partly or wholly the condensate to the saturator.

10. A process of forming ammonium sulphate comprising introducing ammonia and sulphuric acid into a saturator, maintaining said saturator under vacuum, withdrawing the ammonium sulphate formed, separating the crystals from the mother liquor, heating the mother liquor and returning it to the saturator.

11. A continuous process of forming ammonium sulphate comprising reacting ammonia and sulphuric acid in a container while maintaining said container under vacuum.

12. A process of forming ammonium sulphate comprising continuously adding ammonia and sulphuric acid to a saturator maintained under vacuum, continuously withdrawing the ammonium sulphate formed, separating the mother liquor from the crystals of ammonium sulphate heating said mother liquor and returning said mother liquor to the saturator.

DANIEL PYZEL.